Figure 1:
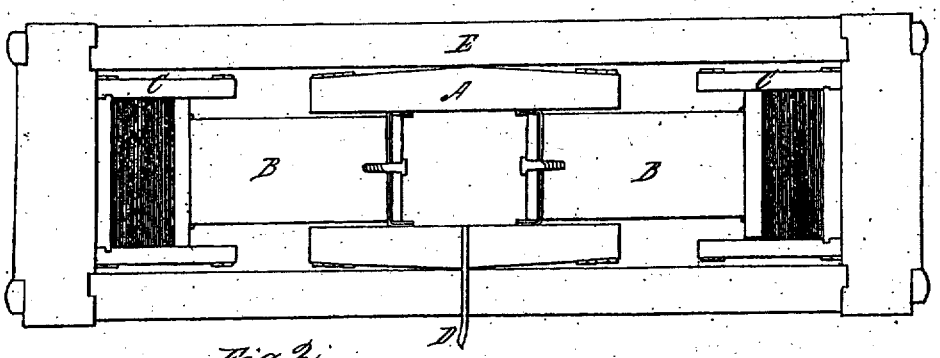
Figure 2:
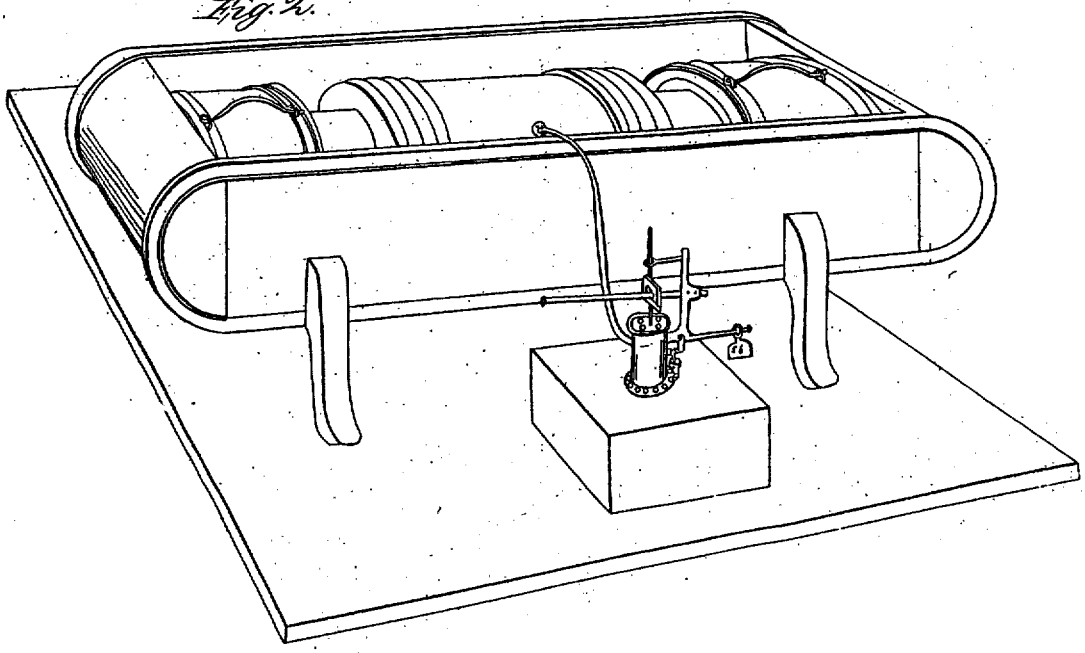

O. BADGER & O. SULL.

DOUBLE HYDROSTATIC OIL PRESS.

Rx 40

PATENTED OCT. 5, 1836.

UNITED STATES PATENT OFFICE.

ORESTES BADGER, OF OTSEGO, AND ORRIN SULL, OF WATERLOO, NEW YORK.

DOUBLE HYDROSTATIC OIL-PRESS.

Specification forming part of Letters Patent No. 40, dated August 9, 1832; Reissued October 5, 1836.

RX 40 RELATED DOC 7196 1/2X

*To all whom it may concern:*

Be it known that I, ORESTES BADGER, of the town of Otsego, in the county of Otsego and the State of New York, and I, ORRIN SULL, of the town of Waterloo, in the county of Seneca, in the State of New York, did on the ninth day of August, in the year one thousand eight hundred and thirty-two, obtain Letters Patent of the United States for an Improvement in Hydrostatic Presses, which we denominated the "Double Hydrostatic Oil-Press"; and we do hereby declare that the following is a full and exact description of the said hydrostatic press, which description is to be taken in lieu of that upon which the above-named Letters Patent were originally granted, the said Letters Patent being hereby surrendered on account of defects which have been discovered in the specification, and the following conforming, as we verily believe, with requirements of the laws in that case made and provided.

The double hydrostatic oil press as constructed by us operates upon the seed, or other substance to be pressed, by means of two pistons which are forced out of the opposite ends of a cylinder placed horizontally, which two pistons are subjected simultaneously to the power produced by the ordinary hydrostatic press, or any forcing pump operating upon the same principle.

The different parts of this press may be varied in size as may be preferred, and the measurements herein given may be considered therefore as only intended to facilitate description, and as presenting the machine in what may be considered its ordinary size. The frame which is to contain the pressing cylinder, the pistons, and the article to be pressed may be made in part of wood, or altogether of iron, care being had so to construct it that it shall have sufficient strength to sustain the great pressure to which it is subjected. It consists mainly of two side pieces, or cheeks, and of two end pieces, or cheeks, and of two end pieces, or heads, the thickness of these will depend upon the materials employed in making them, the end pieces, or heads however are always best made or cast iron, which should be from four to six inches in thickness, when put together the space between the heads should be from eight to ten feet, that between the cheeks from two to two and a half feet, the width of the frame may be from fourteen inches to two feet. It is to be supported upon legs, or blocks which raise it to a convenient height from the floor, say twelve, or fourteen inches, the pressing cylinder is to be placed in the middle between the heads, and sides of the machine frame where it is to be secured by proper plates, and bolts. It may be made of cast iron from three to five feet in length, its chamber extends from end to end, and may be from ten to twelve inches in diameter, its thickness from two, and a half to five inches, and hooped with heavy bars of wrought iron. Into each end of this cylinder is fitted a piston made solid, and fitting the bore, which are to be packed, or leathered in the way usual in hydrostatic presses. These pistons extend out from each end of the cylinder having heads on them, and between which heads, and the end pieces of the frame, the pressure is to be made. The pistons of course must be of such length as to adapt them to the length of the frame, leaving just enough room for the article pressed. The hydrostatic pressure is made, by forcing water into the pressing cylinder through an opening in the middle of the cylinder between the two pistons forcing them out horizontally in the direction of the ends of the frame.

The common forcing pump used for hydrostatic presses together with the safety valve, and usual appendages of hydrostatic presses being employed will produce the necessary pressure in the aforesaid cylinder. The tubs to contain the seed, or other article be pressed, are made, and managed, in the usual manner being placed edgewise resting on bars to sustain them in the proper position between the ends of the pistons, and the heads of the frame.

All that is claimed as constituting the invention or improvement, for which a patent is claimed is—

The employment of two pistons operated upon in the manner, and for the purposes herein set forth for pressing oil from seeds, and for pressing other articles to which the same may be adapted by means of hydrostatic pressure, by which means the labor of so doing is lessened, not because any increase of power is obtained, but because two charges are pressed at the same time, and the charging with water, and also the discharging has to be less frequently performed.

ORESTES BADGER.
ORRIN SULL.

Witnesses to O. Badger:
HENRY BROWN,
JAMES HYDE.

Witnesses to Orrin Sull:
C. FAIRCHILD,
ORRIEN SABIN.

[FIRST PRINTED 1914.]